J. W. BROWN.
BALING PRESS.
APPLICATION FILED JUNE 3, 1910.
977,780.
Patented Dec. 6, 1910.
3 SHEETS—SHEET 1.
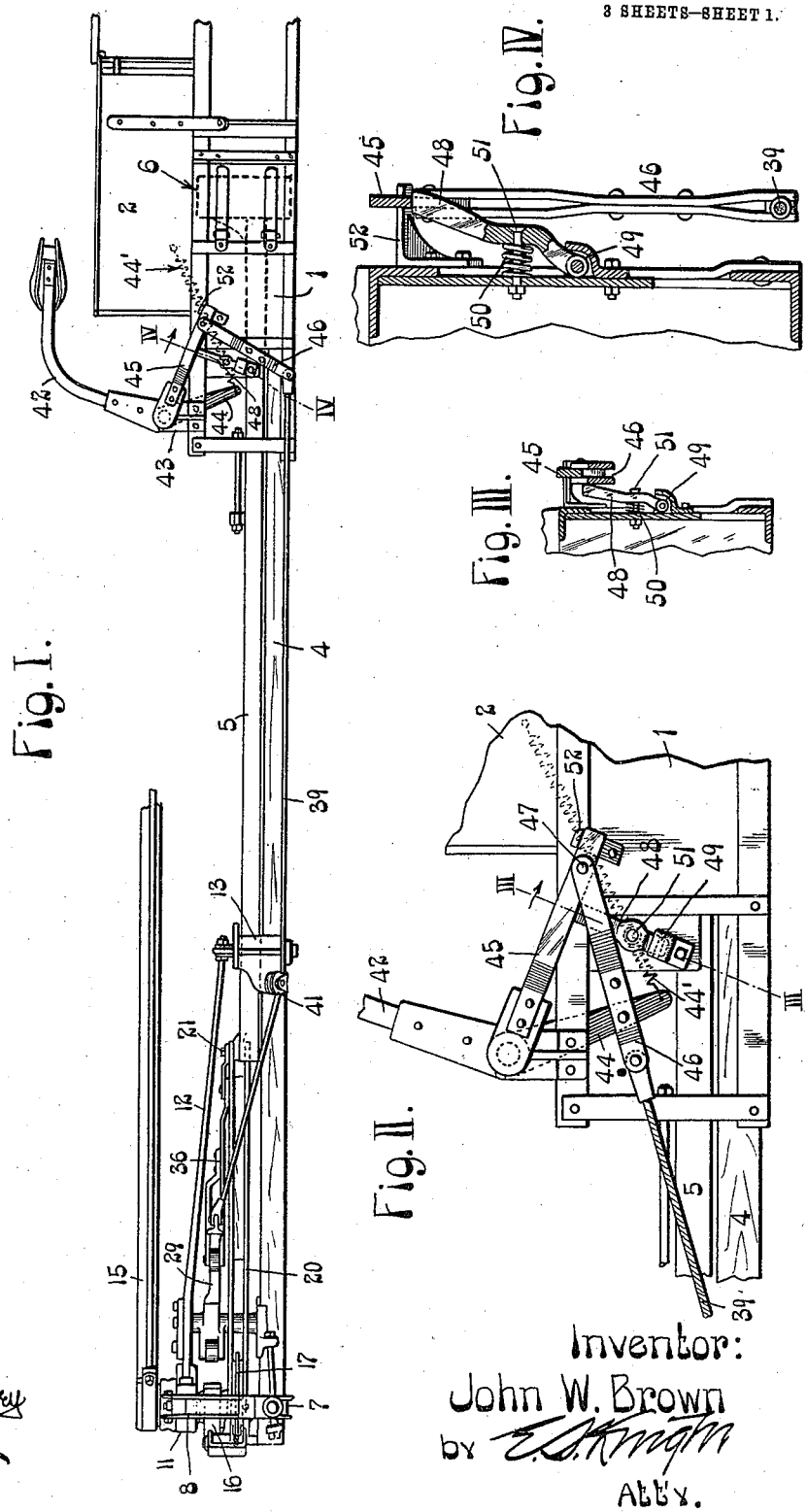
Attest
A. J. McCauley
E. B. [illegible]
Inventor:
John W. Brown
by 
Att'y.

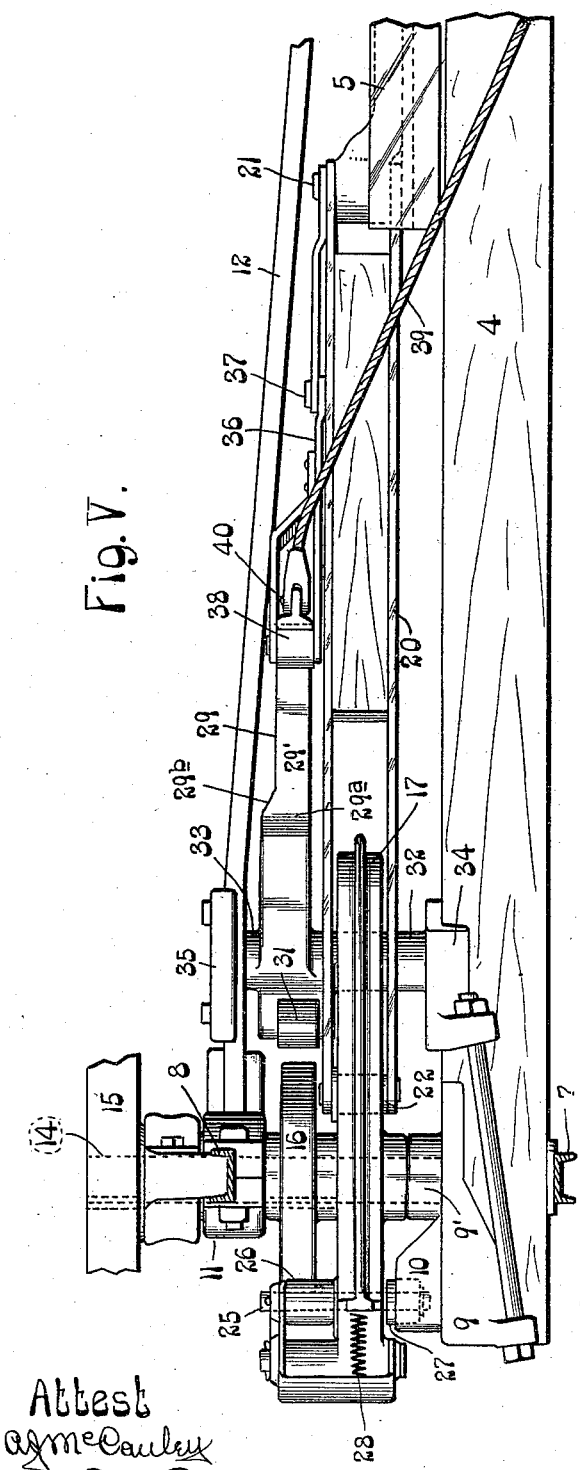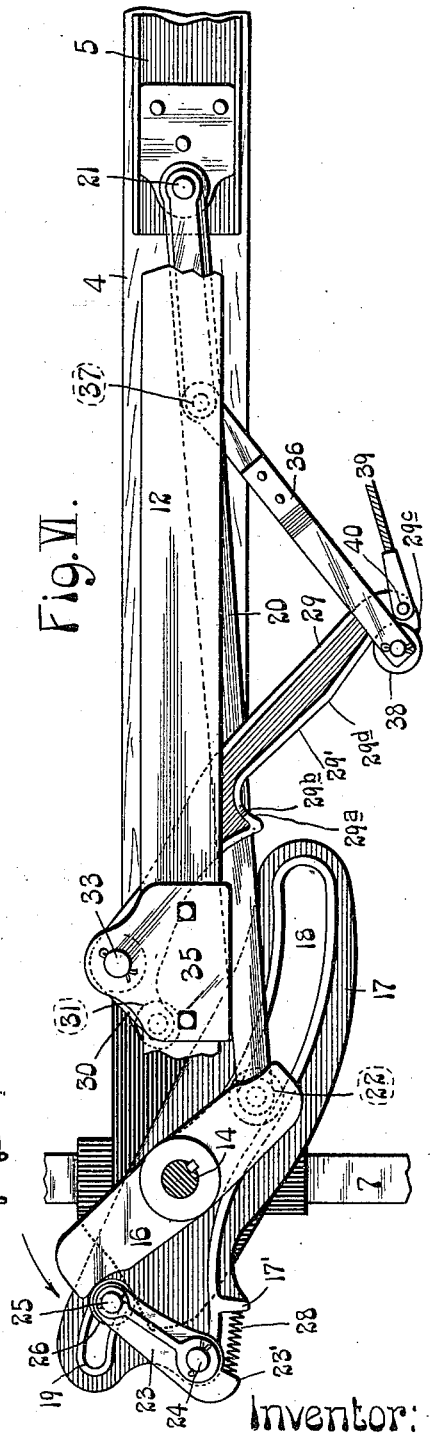

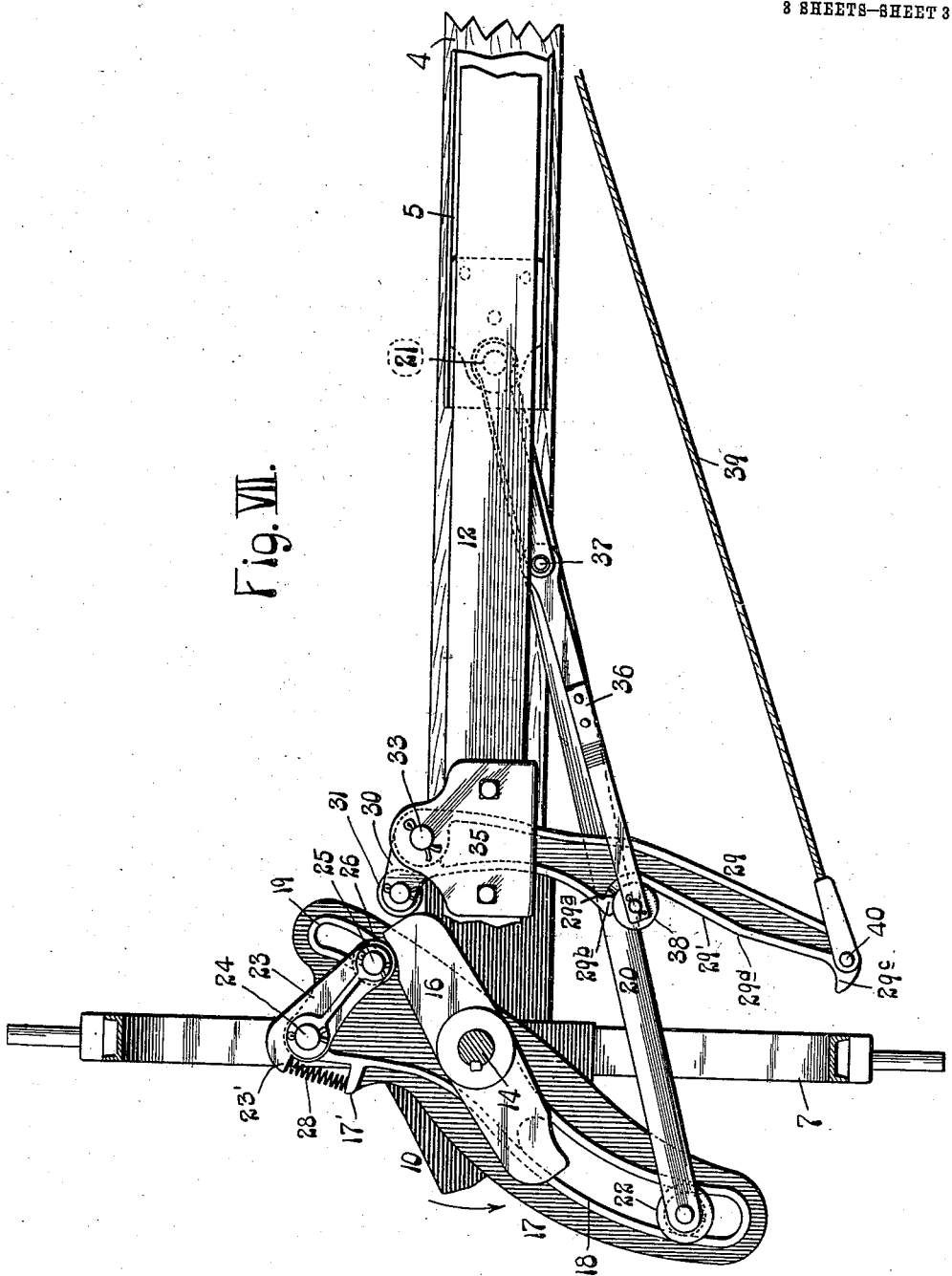

UNITED STATES PATENT OFFICE.

JOHN W. BROWN, OF QUINCY, ILLINOIS, ASSIGNOR TO COLLINS PLOW COMPANY, OF QUINCY, ILLINOIS, A CORPORATION.

BALING-PRESS.

977,780.

Specification of Letters Patent. Patented Dec. 6, 1910.

Application filed June 3, 1910. Serial No. 564,752.

*To all whom it may concern:*

Be it known that I, JOHN W. BROWN, a citizen of the United States of America, residing at Quincy, in the county of Adams and State of Illinois, have invented certain new and useful Improvements in Baling-Presses, of which the following is a full, clear, and exact description, reference being had to the accompanying drawings, forming part of this specification.

My invention relates to that type of baling presses commonly known as full circle baling presses; or, in other words, those wherein the plunger partakes of two or more strokes while the power mechanism is being operated in a full circle.

The invention has for one of its objects the provision of means for accomplishing the return stroke of the plunger with a quick movement at the beginning of such return stroke, in order that the plunger may be speedily removed from the feed opening in the baling chamber for the introduction of charges of material into the chamber and to operate the feeder by the same means as that which imparts a quick initial return stroke of the plunger so that a charge of material is fed into the baling chamber immediately after the plunger has started upon its return stroke.

Another object of my invention is to provide means for locking or retaining the feeder in its uplifted position, and which is arranged to be actuated to release the feeder by the same means as that by which the plunger is moved in its return stroke, and the feeder is lowered to perform its office of feeding a charge of material into the baling chamber.

Figure I is a side elevation of my baling press. Fig. II is an enlarged side elevation of portions of the baling chamber and feeder, the means for elevating the feeder, the pull connection attached to the feeder, and the retaining means for holding the feeder in its raised position. Fig. III is a section taken on line III—III, Fig. II. Fig. IV is an enlarged section taken on line IV—IV, Fig. I. Fig. V is an enlarged side elevation of the power mechanism with the axle of the press located at the power mechanism shown in cross section. Fig. VI is in part an enlarged top or plan view of the power mechanism, and in part a horizontal section, the parts of the power mechanism shown being in the positions assumed when the mechanism has been operated to compress a charge of material in the baling chamber. Fig. VII is an enlarged view similar to Fig. VI, with the parts of the power mechanism shown in the positions assumed when the plunger has been retracted.

In the accompanying drawings:—1 designates a baling chamber of any usual type and which is surmounted by a receiving chamber 2 into which the material to be baled is fed to pass therefrom through a feed opening into the baling chamber. The baling chamber is connected to the power mechanism of the press by a sill 4. 5 is a main pitman operable above the sill 4 and which carries a plunger 6, (see dotted lines Fig. I), operable in the baling chamber. The pitman 5 is preferably of I-beam shape in cross section.

At the power mechanism end of my baling press is an axle that comprises a lower member 7 and upper members 8, preferably of channel shape in cross section, and which are spaced apart from each other to provide for the presence between them of certain parts of the power mechanism. The sill 4 is attached to the lower member of this axle and is surmounted by a bearing block 9 on which is a cam 10 that is of utility to be hereinafter particularly mentioned. The upper members of the axle serve as supports for a bearing box 11 to which is attached a stay 12 that extends longitudinally of the sill 4 and is attached to a guide box or yoke 13 secured to the sill and within which the pitman 5 is free to operate.

14 designates a main power shaft journaled in a bearing 9' surmounting the bearing block 9 on the sill 4 and also journaled in the bearing box 11 supported by the upper axle members 8.

15 is a sweep head fixed to the main power shaft at its upper end and 16 is a double-armed power head fixed to said shaft beneath the bearing box 11.

17 designates a power head loosely fitted to the main power shaft and having a long arm in which there is a cam slot 18 and a short arm containing a slot 19, both of said slots being arranged longitudinally of the power arm.

20 is an auxiliary pitman having its forward end pivoted at 21 to the main pitman 5 and in the rear end of which is mounted a roller 22 that is operable in the cam slot 18 in the power arm.

23 is a dog connected by a pivot pin 24 to the short arm of the power head 17, and in the free end of which is mounted a rod 25 that is operable in the slot 19 in the short arm of the power head. This rod 25 has fitted to it, above the power head, a roller 26 that is adapted to be engaged by the cross head 16 when the dog is in the position seen in Fig. VI, and the rod also has applied to it at its lower end a roller 27 that is adapted to contact with the outer face of the cam 10 above the bearing block 9. The rod 25 is held to the inner end of the slot 19, except when the dog is forced outwardly by the cam 10, by means of a spring 28 interposed between a spring seat 17′ on the short arm of the power head and a spring seat 23′ at the pivot end of the dog. The type of power head and the parts directly coöperable with it utilized for imparting forward stroke to the pitman and plunger of the press are old and no invention is herein claimed for them, they being described only for the purpose of affording a full understanding of the construction and operation of my baling press.

The operation of these parts is as follows: Assuming the pitman to be in the retracted position in which it is seen in Fig. VII and the power head to be in the position in which it is also seen in this view, the cross head 16 as it is rotated with the power shaft, the roller 26 carried by the dog 23, and the rod 25, act upon the power head 17 to impart rotation thereto, with the result of causing said power head to move the auxiliary pitman 20 longitudinally and impart a forward stroke to the main pitman 5 and the plunger carried thereby, whereby a charge of material is compressed in the baling chamber. During the actuation of the pitman and plunger, the roller 22 carried by the auxiliary pitman 20 moves inwardly in the slot 18 in the power head until it reaches the inner end of said slot, as seen in Fig. VI, up to which time the roller 27 at the lower end of the rod 25 mounted in the dog 23 rides upon the cam 10 in such manner as to permit of the spring 28 retaining said rod at the inner end of the slot 19 in the power head. Shortly after the power head has reached the position in which it is seen in Fig. VI, the roller 27 is carried to a point upon the cam 10 that causes the rod 25 to be moved outwardly in the slot 17 and carry the dog 23 with it, thereby permitting the escape of the cross head 16 from the roller 26, in order that it may continue its rotation for a period without any influence upon the power head.

29 designates a pull back lever that is mounted in my press independently of the main power mechanism by which the pitman and plunger are operated for their forward strokes, but which is arranged to be operated by the cross head of such power mechanism. This pull back lever has a long arm and a short arm 30, in which latter arm is mounted an anti-friction roller 31 adapted to be engaged by the arms of the cross head 16 for the actuation of the pull back lever. The pull back lever is located above the sill 4 and in front of the main power mechanism, and at the junction of its long and short arms it is provided with pivot members 32 and 33, the former of which is mounted in a bearing block 34 on the sill 4 and the latter in a bearing block 35 attached to the stay 12, surmounting said sill. The long arm of the pull back lever 29 is provided at its rear side with a working face 29′ extending longitudinally of the arm. At the inner end of this working face is a rearwardly extending curved abutment 29ª formed with a stop lug 29ᵇ, while at the outer end of the working face is a rearwardly curved abutment 29ᶜ. Intermediate of the ends of said working face is a swell 29ᵈ from which the working face is inclined to the abutment 29ᶜ. The functions of the working face on the long arm of the pull back lever and the members at such working face will hereinafter appear.

36 designates a pull rod pivotally connected at 37 to the auxiliary pitman 20 and extending rearwardly to the long arm of the pull back lever 29, the rear portion of this rod being preferably forked so as to straddle the pull back lever.

38 is an anti-friction roller mounted in the pull rod at its free end and adapted to travel upon the working face 29′ of the pull back lever.

39 designates a flexible connection, preferably a rope, as shown, or a chain, that is connected at 40 to the outer end of the long arm of the pull back lever 29. This connection leads forwardly from the pull back lever to the baling chamber of the press and is operable on a sheave 41 attached to the guide box 13 supported by the sill 4.

Adjacent to the baling chamber is a feeder 42 by which the material to be baled is fed from the receiving chamber 2 into the baling chamber 1, this feeder being rockably supported by standards 43, (see Fig. I), mounted upon the framework of the baling chamber. A rock shaft that supports the feeder in said brackets has fixed to it at one end an arm 44 that serves to elevate the feeder after it has been lowered for feeding action. The other end of said rock shaft has fixed to it a feeder operating arm 45, (see Figs. I to IV, inclusive). The connection 39 leading from the pull back arm is attached to the feeder operating arm 45 by a pull rod 46 that is connected at one end to the connection 39, and the other end of which is pivoted at 47 to the feeder operating arm.

48 designates a dog or latch that performs the service of supporting the feeder 42 in its uplifted position to prevent its being accidentally lowered previous to the proper times during the baling operations. This dog is pivotally supported at its lower end by a hinge 49 attached to the side of the baling chamber at which the feeder operating arm 45 and the pull rod 46 are located, and the dog extends upwardly from its point of pivotal support laterally from the baling chamber. Between the dog and the baling chamber is an expansion spring 50 that serves to press the dog outwardly relative to the side of the baling chamber and which is preferably supported by a limitation bolt 51 that connects the dog of the baling chamber and restricts the degree of its outward movement. It will be noted that the dog 48 is located in front of the point of pivotal support of the feeder 42 and consequently understood that when the feeder is permitted to be elevated by the lift spring 44' upon the relaxation of the connection 39, the feeder operating arm 45 is elevated alongside of the dog 48 until it reaches the upper end of said dog and the dog has been pressed inwardly by the operating arm and moves outwardly beneath the operating arm to serve as a retaining or locking member therefor while the feeder is in its uplifted position. The feeder is restricted in its upward movement by a stop 52 attached to the baling chamber.

The operation of the plunger and pitman retracting devices and the feeder operating means of my baling press, which coöperate with each other and work in unison is as follows: It will first be assumed that the parts of the main power mechanism and the pull back arm 29 are in the positions in which they are shown in Figs. I, V and VI, and that the feeder and the parts associated with it are in the positions shown in Figs. I and IV, the positions shown being those occupied by the different parts of the press just previous to the completion of the forward stroke of the plunger and pitman of the press. As soon as the cross head 16 has acted to complete the forward stroke of the plunger, it is relieved of driving action upon the power head 17 in the manner previously explained and immediately after such release its arm, which at this time extends forwardly, moves into engagement with the anti-friction roller 31 carried by the short arm of the pull back lever 29 and by continued contact with said roller for a period of time serves to move the pull back lever from the position seen in Figs. I, V and VI to the position seen in Fig. VII, during which period certain operations of the press about to be explained take place. Previous to the operation of the pull back lever 29, its long arm extends forwardly toward the baling chamber, into which position it has been moved under the influence of the pitman and the pull rod 36, and the anti-friction roller 38 rests against the abutment 29ᶜ at the outer end of the lever, so that it is at the maximum distance from the pivot of said lever. Therefore, when the short arm of the pull back lever is engaged by the cross head 16, the pull back lever acts upon the pull rod 36 through the medium of the anti-friction roller 38 to cause said pull rod to impart an initial retracting movement to the pitman and the plunger of the press that is very rapid due to the long leverage action upon the pull rod and in consequence of which the plunger is speedily sufficiently retracted in the baling chamber to free the feed opening of said chamber in order that a charge of material may be immediately delivered into the baling chamber by the feeder 42. During this initial movement, the connection 39 is acted upon by the pull back lever and exerts a pull upon the connecting rod 46 whereby said pull rod is elevated from the position seen in Figs. I and IV to the position seen in Figs. II and III, and by riding against the outer face of the dog 48 presses said dog inwardly against the action of the spring 50 so that the operating arm 45 of the feeder is released from the restraining influence of said dog, and continued pull upon the pull rod 46 through the medium of the connection 39 and the pull back lever causes initial downward movement of the feeder to perform its office of discharging material from the receiving chamber into the baling chamber.

It will be apparent from the foregoing that while the initial movements are being imparted to the pitman and plunger and the feeder, the anti-friction roller 38 remains at the outer end of the long arm of the pull back lever 29 in engagement with the abutment 29ᶜ, a position it retains until the long arm of the pull back lever has been moved to a right angle relative to the sill 4 by which it is supported. As said long arm passes the position stated in its rearward movement, the anti-friction roller 38 moves inwardly along the working face of the pull back lever toward the swell 29ᵈ, from which it passes quickly to the abutment 29ᵇ at the inner end of said working face. During this travel of the anti-friction roller on the working face of the pull back lever, the speed of retracting movement of the pitman and plunger is diminished, but the plunger is gradually retracted so as to completely free the feed opening in the baling chamber in order that the feeder may operate more freely and easily therethrough. As the anti-friction roller 38 travels inwardly on the working face of the pull back lever, said lever is enabled to exert greater power upon the pull rod 36 and consequently upon the pitman and plunger and the increase of power is continued until the maximum is reached at the time that the roller comes into engagement with the abutment 29^b. As a consequence, it is possible for the pull back lever to retract the pitman and plunger more readily during the remainder of their retraction after the initial movement and also serve to operate the feeder through the medium of the connection 39 more easily than would be the case if the connection from the pitman remained at the outer end of the long arm of the pull back lever instead of moving inwardly previous to the time at which the feeder requires the greatest power in its operation. It is further to be noted that due to the presence of the swell 29^d upon the working face of the long arm of the pull back lever, said working face is rendered irregular in shape, and this and the presence of this swell provides for the anti-friction roller remaining at the outer end of the working face of the lever until the plunger of the press has practically cleared the feed opening in the baling chamber.

It will be readily understood that as soon as the pull back lever has performed its office and has been released due to the disengagement of the head 16 in its travel, the feeder, having performed its function, is elevated through the influence of the lift spring 44' to be engaged and upheld by the dog 48 and that in consequence of this movement of the feeder, the connection 39 is drawn forwardly and acts to impart rearward movement to carry the pull back lever into the position seen in Figs. I, V, and VI ready for its next operation after the forward stroke of the pitman and plunger has taken place.

I claim:—

1. In a baling press, the combination with a pitman, a feeder and power mechanism, of a pull back lever operable by said power mechanism, a connection between said pull back lever and pitman, and a connection between said pull back lever and said feeder, the connection between the lever and pitman being arranged to provide for a variation in the speed of movement of said pitman between the initial period of its return stroke and the remainder of its return stroke.

2. In a baling press, the combination with a pitman, a feeder and power mechanism, of a pull back lever operable by said power mechanism, a connection between said pull back lever and pitman movable longitudinally of the lever, and a connection between said pull back lever and said feeder.

3. In a baling press, the combination with a pitman, a feeder and power mechanism, of a pull back lever operable by said power mechanism, a connection between said pull back lever and pitman, and a connection between said pull back lever and said feeder, the connection between the pull back lever and pitman being arranged to impart a more rapid movement to said pitman and feeder during the initial portion of the return stroke of the pitman than during the remainder of its return stroke.

4. In a baling press, the combination with a pitman, a feeder and power mechanism, of a pull back lever operable by said power mechanism, a connection between said pull back lever and pitman, and a connection between said pull back lever and said feeder, the connection between the pull back lever and pitman being arranged to impart a rapid movement to said pitman during the initial portion of its return stroke, and being movable toward the pivotal point of the pull back lever to provide for greater exertion of power thereupon by said lever during the remainder of the return stroke of the pitman.

5. In a baling press, the combination with a pitman, a feeder movably in an arc of a circle and power mechanism, of a pull back lever operable by said power mechanism, a connection between said pull back lever and pitman operable on the pull back lever, and a connection between said pull back lever and said feeder, said connection providing for a rapid initial return movement of the pitman and rapid arcuate movement of the feeder simultaneously with the initial return movement of said pitman.

6. In a baling press, the combination with a pitman, a feeder and power mechanism, of a pull back lever having a short arm operable by said power mechanism, and a long arm provided with a working face extending longitudinally thereof, a connection between said pitman and said long arm having a part operable upon the working face of said long arm, and a connection between said pull back lever and said feeder.

7. In a baling press, the combination with a pitman, a feeder and power mechanism, of a pull back lever operable by said power mechanism, one of the arms of which is provided with a working face extending longitudinally thereof, a connection between said pull back lever and pitman having a roller operable on the working face of the pull back lever, and a connection between said pull back lever and said feeder.

8. In a baling press, the combination with a pitman, a feeder and power mechanism, of a pull back lever operable by said power mechanism, one of the arms of which is provided with a working face extending longitudinally thereof, a connection between said pull back lever and pitman having a roller operable on the working face of the pull back lever, a connection between said pull back lever and said feeder, and the arm of said pull back lever to which said pitman is connected being provided with an abutment at each end of its working face.

9. In a baling press, the combination with a pitman, a feeder and power mechanism, of a pull back lever operable by said power mechanism, one of the arms of which is provided with a working face extending longitudinally thereof, a connection between said pull back lever and pitman having a roller operable on the working face of the pull back lever, and a connection between said pull back lever and said feeder, the arm of said pull back lever to which the pitman is connected being provided with an abutment at each end of its working face, and a swell intermediate of the ends of said working face.

10. In a baling press, the combination with a pitman, a feeder and power mechanism, of a pull back lever operable by said power mechanism, one of the arms of which is provided with a working face extending longitudinally thereof, a pull rod pivotally connected to said pitman and provided with a member operable longitudinally of the working face of said pull back lever, and a connection between said pull back lever and said feeder.

11. In a baling press, the combination with a pitman, a feeder and power mechanism, of a pull back lever operable by said power mechanism, one of the arms of which is provided with a working face extending longitudinally thereof, a pull rod pivotally connected to said pitman and provided with a member operable longitudinally of the working face of said pull back lever, an antifriction roller carried by the pull rod and adapted to ride on the working face of the pull back lever, and a connection between said pull back lever and feeder.

12. In a baling press, the combination of a baling chamber, a feeder for delivering material to said baling chamber, means for operating said feeder, and a dog for retaining said feeder in an elevated position.

13. In a baling press, the combination of a baling chamber, a feeder for delivering material to said baling chamber, means for operating said feeder, and a dog for retaining said feeder in an elevated position; said feeder operating means including a member by which said dog may be moved to release said feeder previous to its feeding action.

14. In a baling press, the combination of a baling chamber, a feeder for delivering material to the baling chamber, means for elevating said feeder, a dog for retaining the feeder in an elevated position, and means for operating said feeder by which said dog is actuated to release the feeder.

15. In a baling press, the combination of a baling chamber, a feeder for delivering material to the baling chamber, means for elevating said feeder, a spring controlled dog for retaining the feeder in an elevated position, and means for operating said feeder by which said dog is actuated to release the feeder.

16. In a baling press, the combination of a baling chamber, a feeder operable to deliver material into said baling chamber and which is provided with an operating arm, a spring controlled dog for engagement with said operating arm to hold the feeder in an elevated position, and means connected to said operating arm whereby said dog is actuated to release the feeder.

17. In a baling press, the combination of a baling chamber, a feeder operable to deliver material into said baling chamber and which is provided with an operating arm, a spring controlled dog for engagement with said operating arm to hold the feeder in an elevated position, and a power operated device having a pull rod connected to the feeder operating arm and adapted to be moved into engagement with said dog to carry it out of engagement with said operating arm and permit actuation of the feeder by said power operated device.

JOHN W. BROWN.

In the presence of—
 GEORGE W. LOVERT,
 NEVEDA S. PROCTOR.